United States Patent
Baek et al.

(10) Patent No.: US 11,997,705 B2
(45) Date of Patent: May 28, 2024

(54) METHOD AND APPARATUS FOR PERFORMING SCHEDULING REQUEST

(71) Applicant: Samsung Electronics Co., Ltd., Suwon-si (KR)

(72) Inventors: Sangkyu Baek, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 17/593,021

(22) PCT Filed: Mar. 23, 2020

(86) PCT No.: PCT/KR2020/003946
§ 371 (c)(1),
(2) Date: Sep. 3, 2021

(87) PCT Pub. No.: WO2020/197219
PCT Pub. Date: Oct. 1, 2020

(65) Prior Publication Data
US 2022/0201706 A1    Jun. 23, 2022

(30) Foreign Application Priority Data
Mar. 28, 2019   (KR) ................. 10-2019-0036032

(51) Int. Cl.
*H04W 72/566* (2023.01)
*H04W 28/02* (2009.01)

(52) U.S. Cl.
CPC ..... *H04W 72/569* (2023.01); *H04W 28/0278* (2013.01)

(58) Field of Classification Search
CPC ........... H04W 72/569; H04W 28/0278; H04W 72/21; H04W 72/1263; H04W 72/20
See application file for complete search history.

(56) References Cited

U.S. PATENT DOCUMENTS

| 2018/0324635 A1* | 11/2018 | Babaei ................. H04W 72/23 |
| 2019/0182896 A1* | 6/2019 | Shrestha .............. H04W 72/56 |
| 2020/0221490 A1 | 7/2020 | Baek et al. |

FOREIGN PATENT DOCUMENTS

| CN | 108012332 A * | 5/2018 | .......... H04L 5/0064 |
| KR | 10-2020-0085138 A | 7/2020 | |

(Continued)

OTHER PUBLICATIONS

Supplementary European Search Report dated Mar. 14, 2022, in connection with European Application No. 20776935.7, 11 pages.

(Continued)

*Primary Examiner* — Dinh Nguyen

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security, and safety-related services, and the like) on the basis of 5G communication technology and IoT-related technology. Disclosed are a method and a terminal for performing same, the method being performed by a terminal in a wireless communication system and comprising the steps of: triggering a buffer status report (BSR); triggering a scheduling request (SR) for the BSR; transmitting a medium access control (MAC) protocol data unit (PDU) including the BSR before the transmission of the SR; and determining whether the triggered SR is cancelled on the basis of information about a logic channel corresponding to the SR and logic channel information about the MAC PDU.

15 Claims, 14 Drawing Sheets

(56) References Cited

FOREIGN PATENT DOCUMENTS

WO     WO-2011082675 A1 *   7/2011   ............ H04W 72/04
WO     2017074437 A1     5/2017

OTHER PUBLICATIONS

Huawei, et al., "SR triggering and cancellation," R2-1706986, 3GPP TSG-RAN WG2 NR Ad Hoc, Qingdao, China, Jun. 27-29, 2017, 3 pages.

Huawei, et al., "Discussion on immediate transmission," R2-1801811, 3GPP TSG-RAN WG2 Meeting #101, Athens, Greece, Feb. 26-Mar. 2, 2018, 5 pages.

Samsung Electronics R&D Institute UK, "Finalising the design of SR and BSR triggering and cancellation mechanisms," R2-1803866, 3GPP TSG-RAN WG2 #101, Athens, Greece, Feb. 26-Mar. 2, 2018, 3 pages.

International Search Report and Written Opinion of the International Searching Authority dated Jul. 2, 2020, in connection with International Application No. PCT/KR2020/003946, 13 pages.

Ericsson, "On scheduling request overlapping with UL-SCH," R2-1901302 revision of R2-1817177, 3GPP TSG-RAN WG2 #105, Athens, Greece, Feb. 25-Mar. 1, 2019, 4 pages.

Huawei (Rapporteur), "E-mail discussion summary [104#39][NR/IIOT] Intra UE prioritization UL Control Data (Huawei)," R2-1901439, 3GPP TSG-RAN WG2 #105, Athens, Greece, Feb. 25-Mar. 1, 2019, 34 pages.

Intel Corporation, "Remaining issues in BSR," R2-1802952, 3GPP TSG RAN WG2 Meeting #101, Athens, Greece, Feb. 26-Mar. 2, 2018, 7 pages.

3GPP TS 38.321 V15.4.0 (Dec. 2018), Technical Specification, 3rd Generation Partnership Project; Technical Specification Group Radio Access Network; NR; Medium Access Control (MAC) protocol specification (Release 15), Dec. 2018, 77 pages.

* cited by examiner

METHOD AND APPARATUS FOR PERFORMING SCHEDULING REQUEST

CROSS-REFERENCE TO RELATED APPLICATIONS

This application is a 371 National Stage of International Application No. PCT/KR2020/003946, filed Mar. 23, 2020, which claims priority to Korean Patent Application No. 10-2019-0036032, filed Mar. 28, 2019, the disclosures of which are herein incorporated by reference in their entirety.

BACKGROUND

1. Field

The disclosure relates to operations of a terminal and a base station in a mobile communication system. In addition, the disclosure relates to a method and an apparatus for requesting scheduling for traffic (for example, ultra reliable low latency communication (URLLC) traffic) in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In addition, improved communication methods and apparatuses for URLLC communication are necessary in next-generation communication systems.

The above information is presented only as background information, and is provided to help understanding of the disclosure. No determination has been made regarding whether any of the above descriptions is applicable as the prior art in connection with the disclosure, and no claim has been made either.

SUMMARY

A technical problem to be solved by an embodiment of the disclosure is to provide an improved communication method. In addition, another technical problem to be solved by an embodiment of the disclosure is to provide a method and an apparatus for requesting scheduling for URLLC traffic in a mobile communication system.

An embodiment of the disclosure for solving the above-mentioned problems may provide a method performed by a terminal in a communication system, the method including: triggering a buffer status report (BSR); triggering a scheduling request (SR) for the BSR; transmitting a medium access control (MAC) protocol data unit (PDU) including the BSR, before transmission of the SR; and determining whether to cancel the triggered SR, based on information on a logical channel corresponding to the SR and logical channel information associated with the MAC PDU.

In addition, an embodiment of the disclosure may provide a terminal in a wireless communication system, the terminal including: a transceiver; and a controller configured to control to trigger a buffer status report (BSR), trigger a scheduling request (SR) for the BSR, transmit a medium access control (MAC) protocol data unit (PDU) including the BSR, via the transceiver, before transmission of the SR, and determine whether to cancel the triggered SR, based on information on a logical channel corresponding to the SR and logical channel information associated with the MAC PDU.

In addition, an embodiment of the disclosure may provide a method performed by a base station in a wireless communication system, the method including: transmitting scheduling request (SR) configuration information to a terminal; receiving a medium access control (MAC) protocol data unit (PDU) including a buffer status report (BSR) from the terminal; and in case that a scheduling request (SR) for the BSR is not canceled in the terminal, receiving the SR, wherein cancellation of an SR triggered by the terminal is determined based on information on a logical channel corresponding to the SR and logical channel information associated with the MAC PDU.

In addition, an embodiment of the disclosure may provide a base station in a wireless communication system, the base station including: a transceiver; and a controller configured to control to transmit scheduling request (SR) configuration information to a terminal via the transceiver, receive a medium access control (MAC) protocol data unit (PDU) including a buffer status report (BSR) from the terminal via the transceiver, and in case that a scheduling request (SR) for the BSR is not canceled in the terminal, receive the SR via the transceiver, wherein cancellation of an SR triggered by the terminal is determined based on information on a logical channel corresponding to the SR and logical channel information associated with the MAC PDU.

The technical subjects pursued in the disclosure may not be limited to the above mentioned technical subjects, and other technical subjects which are not mentioned may be clearly understood, through the following descriptions, by those skilled in the art to which the disclosure pertains.

According to an embodiment of the disclosure, an improved communication method may be provided. In addition, according to an embodiment of the disclosure, a method and an apparatus for requesting scheduling for URLLC traffic in a mobile communication system may be provided.

DETAILED DESCRIPTION

Figure 1:
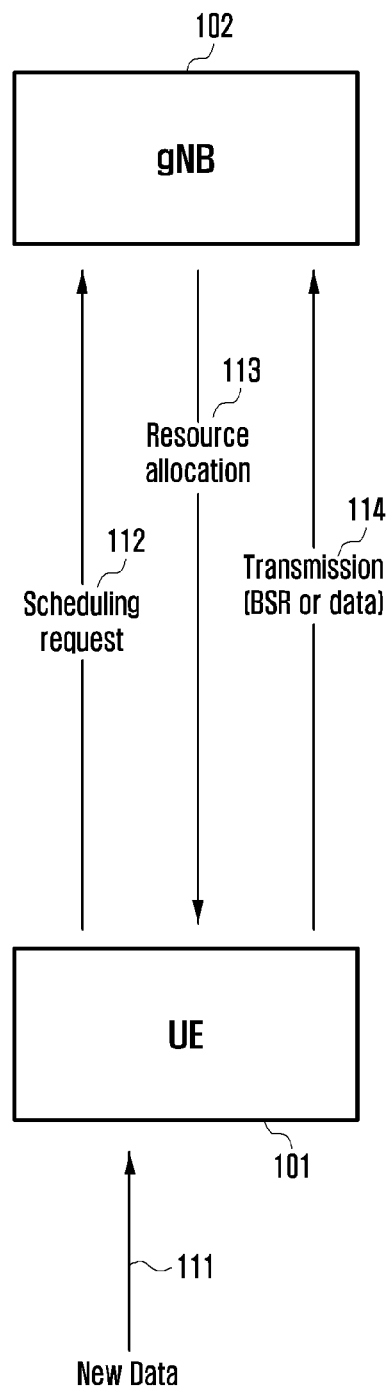
FIG. 1 illustrates a resource allocation procedure of a UE and a base station in a wireless communication system according to an embodiment of the disclosure.

Hereinafter, embodiments of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

FIG. 1 illustrates a resource allocation procedure of a UE and a base station in a wireless communication system according to an embodiment of the disclosure.

Referring to FIG. 1, when new data has arrived (111), a user equipment (UE) 101 is required to request, to a gNB 102, that the corresponding data exists, in order to perform uplink transmission to the gNB 102. This is referred to as a buffer status report (BSR), and a buffer status report message may be transmitted including information on how much data to be transmitted remains in data of each logical channel group. The condition in which the BSR is triggered may include a case in which 1) the priority of a logical channel at which new data is arrived is higher than the priorities of logical channels having existing data, 2) there is no data to be transmitted in all logical channels, or the like.

However, in a case where a radio resource on which the UE 101 can transmit the BSR does not remain, the UE 101 may trigger a scheduling request (SR) message to transmit the scheduling request message to the gNB 102 (112). The corresponding scheduling request message may be transmitted using a resource pre-allocated to a physical uplink control channel (PUCCH) or a physical uplink shared channel (PUSCH). Each logical channel may trigger a BSR, and accordingly, have an SR configuration that can be used when an SR is triggered, and transmit the SR by selecting an SR transmission resource indicated by the SR configuration. After receiving the SR, the gNB 102 may allocate, to the UE 101, a resource on which the UE 101 can transmit data (113). The UE 101 may transmit all remaining data, transmit the data and the BSR together, or transmit only the BSR, according to the size of the resource allocated from the gNB 102 (114).

Figure 2:
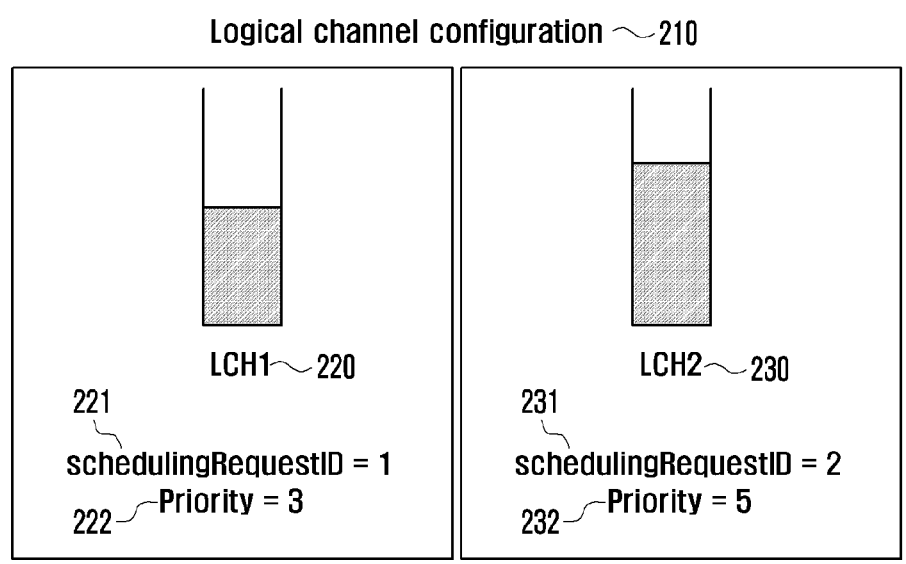
FIG. 2 illustrates an example of a logical channel configuration according to an embodiment of the disclosure.

FIG. 2 illustrates an example of a logical channel configuration according to an embodiment of the disclosure.

FIG. 2 illustrates that two logical channels including logical channel (LCH) 1 220 and logical channel 2 230 are configured. A base station may instruct a UE to configure logical channels to be used (210). Each of the logical channels may have a logical channel configuration value.

Each of the logical channels may be distinguished by a logical channel ID. In addition, each of the logical channels has an SR configuration that can be used by the corresponding logical channel. The corresponding SR configuration may have a scheduling request ID 221 or 231, and each of the scheduling request IDs may correspond to a scheduling request configuration, so that it is possible to be aware of a scheduling request configuration to be used. According to an embodiment, each of the logical channels may use zero or more SR configurations. In FIG. 2, it is assumed that a scheduling request ID used by the logical channel 1 is 1 and a scheduling request ID used by the logical channel 2 is 2. In addition, in each of the logical channels, a priority 222 or 232 to be used for BSR triggering and SR triggering may be configured. In this case, the high priority may mean that corresponding priority values 222 and 232 are low. For example, the case of the priority value 222=3 may be interpreted as having a higher priority than the case of the priority value 232=5. The UE may determine whether or not to trigger an SR or a BSR by using the priority values. In addition, the priority values may be used to determine a transmission to be priorly performed when a triggered SR overlaps with another data or an SR resource on the time axis or the time and frequency axes.

Figure 3:
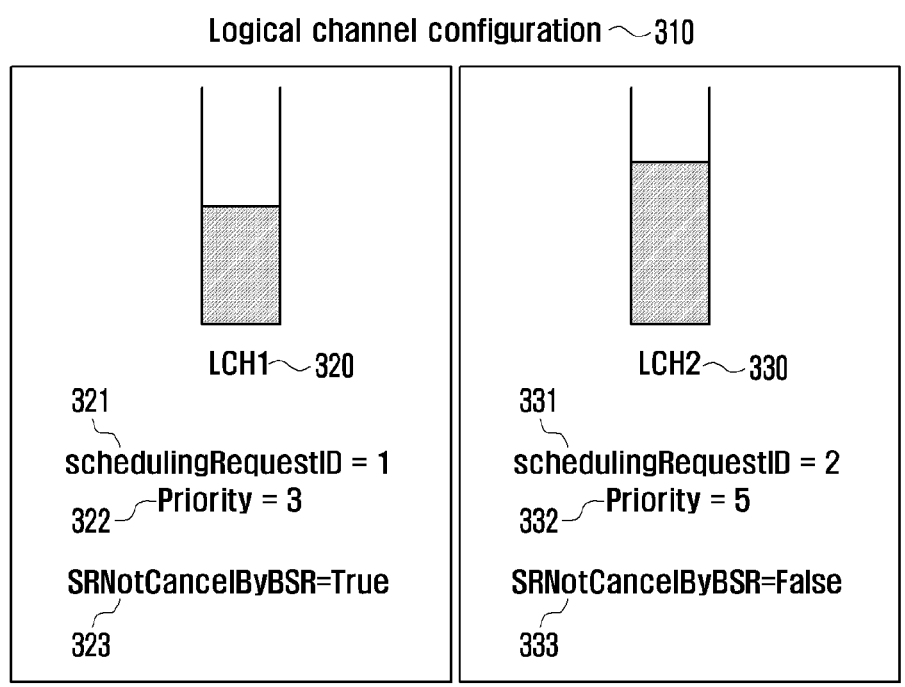
FIG. 3 illustrates an embodiment of a logical channel configuration in which a scheduling request (SR) transmission scheme is configured according to an embodiment of the disclosure.

FIG. 3 illustrates an embodiment of a logical channel configuration in which an SR transmission scheme is configured according to an embodiment of the disclosure.

FIG. 3 illustrates that two logical channels including logical channel (LCH) 1 320 and logical channel 2 330 are configured. A base station may instruct a UE to configure logical channels to be used (310). Each of the logical channels may have a logical channel configuration value. Each of the logical channels may be distinguished by a logical channel ID. In addition, each of the logical channels has an SR configuration that can be used by the corresponding logical channel. The corresponding SR configuration may have a scheduling request ID 321 or 331, and each of the scheduling request IDs may correspond to a scheduling request configuration, so that it is possible to be aware of a scheduling request configuration to be used. According to an embodiment, each of the logical channels may use zero or more SR configurations. In FIG. 3, it is assumed that a scheduling request ID used by the logical channel 1 is 1 and a scheduling request ID used by the logical channel 2 is 2. In addition, in each of the logical channels, a priority 322 or 332 to be used for BSR triggering and SR triggering may be configured. In this case, the high priority may mean that corresponding priority values 322 and 332 are low. For example, the case of the priority value 322=3 may be interpreted as having a higher priority than the case of the priority value 332=5. The UE may determine whether or not to trigger an SR or a BSR by using the priority values. In addition, the priority values may be used to determine a transmission to be priorly performed when a triggered SR overlaps with another data or an SR resource on the time axis or the time and frequency axes.

Although the UE has triggered an SR since there is no resource for transmitting a BSR after the BSR is triggered, the UE may transmit the BSR before the corresponding SR is transmitted, and in case that the UE has reported all buffer statuses up to the above time point to the BSR, the UE may cancel transmission of the SR since the transmission of the SR is no longer required. However, since the BSR may be transmitted by being included in a general medium access control (MAC) protocol data unit (PDU), a delay due to retransmission may occur. In a case of an SR triggered by a logical channel that processes URLLC data having a high priority, in case that the SR is canceled due to BSR transmission, transmission of the SR may be delayed due to a delay of the BSR. Therefore, in this case, the SR should not be canceled when the BSR is transmitted, and the SR may be canceled at the time point when transmission of data of the corresponding logical channel, generated at the time point when the SR is triggered or at the time point when the preceding BSR is triggered, is completed. In another embodiment, the SR may not be canceled when the BSR is transmitted, and the SR may be canceled by determining a successful transmission of a MAC PDU including the BSR. Such a successful transmission may be determined on the basis that a new data indicator (NDI) of a hybrid automatic repeat request (HARQ) process in which the corresponding MAC PDU is transmitted is toggled or HARQ ACK is received.

However, it may not be necessary to apply the procedure for performing cancellation of an SR due to a BSR described above to all SRs. In the embodiment of FIG. 3, for an SR triggered by a logical channel in which a corresponding field is configured to be True by using SRNotCancelByBSR fields 323 and 333, cancellation of the SR due to BSR transmission may not be performed. In the embodiment of FIG. 3, since the SRNotCancelByBSR field 323 is configured to be True in the logical channel 1, the UE does not cancel an SR triggered by the logical channel 1 even in case that a BSR is transmitted. However, since the SRNotCancelByBSR field 333 is configured to be False in the logical channel 2, the UE may cancel an SR triggered by the logical channel 2 in case that a BSR is transmitted. The names of the SRNotCancelByBSR fields may be configured as a different name, and configuration values are not limited to TRUE and FALSE, and may be indicated by various information indicating whether SR transmission can be canceled based on a BSR.

Figure 4:
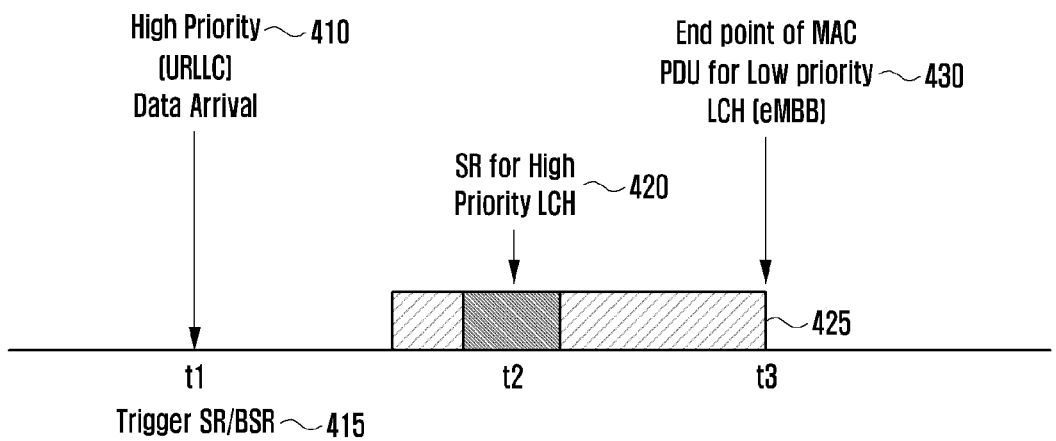
FIG. 4 illustrates a scenario in which radio resources of an SR and a medium access control (MAC) protocol data unit (PDU) conflict, according to an embodiment of the disclosure.

FIG. 4 illustrates a scenario in which radio resources of an SR and a MAC PDU conflict, according to an embodiment of the disclosure.

Referring to FIG. 4, when data having a high priority arrives at a UE (or when data having a high priority is generated in the UE, or when data having a high priority is generated by the UE), in case that there is no data equal to or higher than the priority of a logical channel through which the corresponding data is processed (410), a BSR is triggered by the corresponding logical channel (415, t1). Further, in case that there is no resource in which the BSR can be transmitted, the UE triggers an SR, and may prepare to transmit the SR to a resource of an SR configuration configured in a logical channel that has triggered the SR. In this case, in case that an SR resource (420, t2) that the UE intends to transmit overlaps with a MAC PDU 425 capable of transmitting data, the UE is required to determine whether to transmit the SR or whether to include the BSR in the MAC PDU and transmit the same. The overlapping of the SR and the MAC PDU may mean that the SR resource and a resource of the MAC PDU are located at the same time point only on the time axis, and in some cases, may mean that the resources overlap on both the time axis and the frequency axis. The embodiment of the disclosure can be always applied regardless of the above two types of overlap of the resources. In this case, the UE may determine whether to transmit the SR or whether to transmit the MAC PDU by using the priorities described in the embodiments of FIGS. 2 and 3.

For each MAC PDU, logical channels to use a MAC PDU resource may be determined by a logical channel configuration. Specifically, an available cell, subcarrier spacing (SCS), PUSCH duration, and the like may be configured for each logical channel. Based on the above configuration, it is possible to be aware of a logical channel by which a MAC PDU can be used. In addition, among logical channels that can use the MAC PDU, logical channels having data participate in a logical channel prioritization (LCP) process to include data of each of the logical channels in the MAC PDU and transmit the same. In this case, by comparing the priority of the logical channel that has triggered the SR and the highest priority among the priorities of the logical channels having data among the logical channels that can use the MAC PDU, the transmission with the higher priority may be selected. For example, when it is assumed that the priorities of logical channels having data to transmit among the logical channels that can use the MAC PDU are 3 and 4, respectively, and the priority of the logical channel that has triggered the SR is 2, the SR may be transmitted.

However, the SR having the priority may be limited and used only when a resource for transmitting the SR ends before an end point (430, t3) on the time axis of a resource in which the MAC PDU is transmitted. It may be possible to transmit both the SR and the MAC PDU according to the capability of the UE. In this case, even in case that the BSR includes data of the logical channel that has triggered the SR, in case that the highest priority of a logical channel included in the MAC PDU including the corresponding BSR is lower than the priority of the logical channel that has triggered the SR, the SR is required to be transmitted without being canceled.

Figure 5:
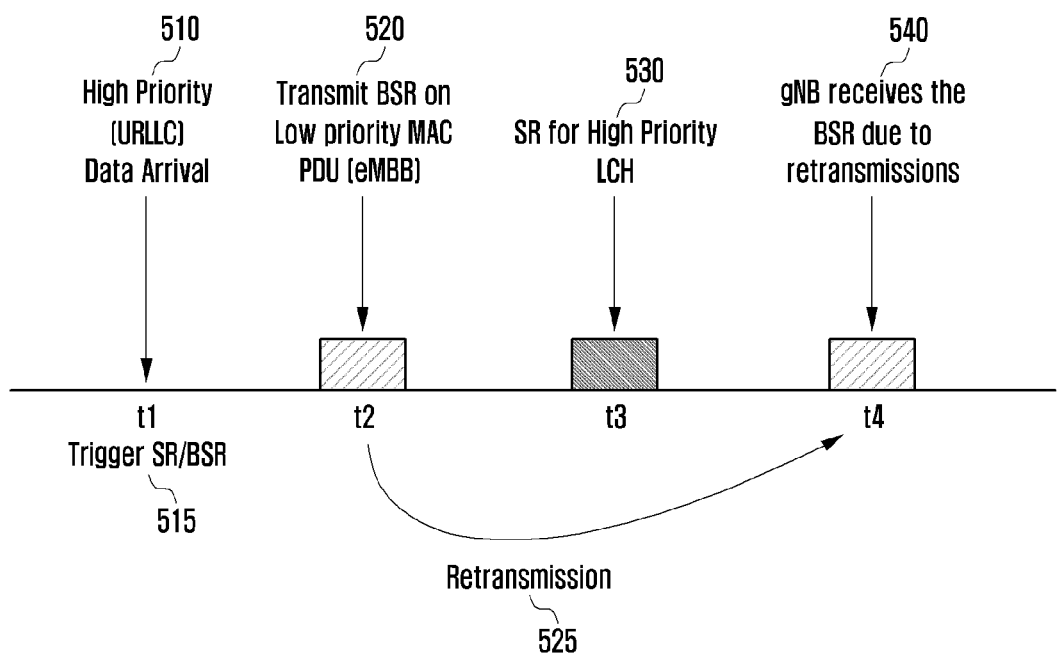
FIG. 5 illustrates an embodiment in which an SR is not canceled according to an embodiment of the disclosure.

FIG. 5 illustrates an embodiment in which an SR is not canceled according to an embodiment of the disclosure.

Referring to FIG. 5, when data having a high priority arrives at a UE, in case that there is no data having a priority higher than or equal to the priority of a logical channel through which the corresponding data is processed (510), a BSR is triggered by the corresponding logical channel (515, t1). Further, in case that there is no resource in which the BSR can be transmitted, the UE triggers an SR and may prepare to transmit the SR to a resource of an SR configuration configured in a logical channel that has triggered the SR (515). In the embodiment of FIG. 5, it is assumed that the resource in which the SR triggered in operation 515 is transmitted is an SR resource in operation 530. However, in case that a MAC PDU capable of transmitting the BSR is allocated before the SR is transmitted (t2), the BSR may be included in the MAC PDU and transmitted (520). However, in case that the priority of the logical channel that has triggered the SR is higher than the highest priority among the priorities of logical channels which the MAC PDU can transmit, the transmission of the MAC PDU including the BSR cannot guarantee fast data transmission of the logical channel that has triggered the SR. For example, the MAC PDU transmitted in operation 520 may fail to be successfully transmitted and thus may be instructed to be retransmitted (525), and accordingly, the MAC PDU may be transmitted at a delayed time (t4) (540). Therefore, in this case, the BSR may not be transmitted in operation 520. In other words, a MAC PDU that can be used by only logical channels having a lower priority than the priority of a logical channel by which the BSR has been triggered may not include a BSR triggered by high priority. Since the BSR is not included, the SR may be transmitted in the configured SR resource (530). A MAC PDU that can be used by a logical channel having a higher priority than the priority of the logical channel by which the BSR has been triggered may include the BSR. In this case, the UE may cancel the triggered SR for the BSR.

In another embodiment, when the BSR is included in the MAC PDU used by logical channels having a lower priority than that of the logical channel by which the SR has been triggered in operation 520, the UE may not cancel the SR. That is, in case that the priority of the logical channel by which the SR has been triggered is higher than the highest priority among the priorities of logical channels which can be transmitted through the MAC PDU, the UE may not cancel the SR even in case that the BSR is included in the MAC PDU. Accordingly, the SR can be transmitted in a resource in which the SR is configured, regardless of whether the BSR is transmitted for a low-priority resource (530). In case that the priority of the logical channel by which the SR has been triggered is lower than or equal to the highest priority among the priorities of the logical channels which can be transmitted through the MAC PDU, and the BSR has been transmitted to the corresponding MAC PDU, the UE may cancel the SR.

In another embodiment, when the BSR is included in a MAC PDU that cannot be used by the logical channel by which the SR has been triggered in operation 520, the UE may not cancel the SR. In case that the logical channel by which the SR has been triggered can use the corresponding MAC PDU, the UE may cancel the SR after transmitting the BSR.

Figure 6:
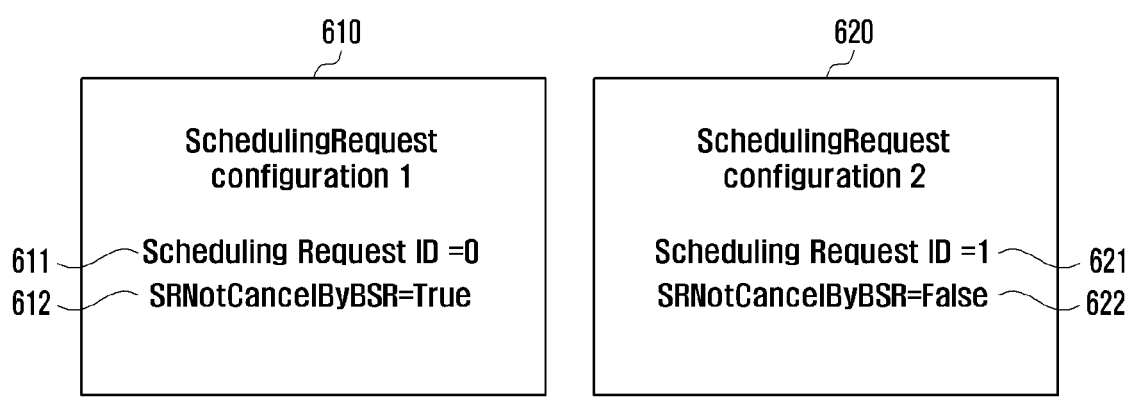
FIG. 6 illustrates an embodiment in which an SR configuration is configured according to an embodiment of the disclosure.

FIG. 6 illustrates an embodiment in which an SR configuration is configured according to an embodiment of the disclosure.

Referring to FIG. 6, a UE may have multiple SR configurations 610 and 620, and each logical channel may use zero or more SR configurations. Although it is assumed to have two SR configurations in the embodiment of FIG. 6, more SR configurations may be provided. The SR configurations may have SchedulingRequestIDs 611 and 621 which are identifiers for distinguishment for each configuration, respectively. Each logical channel may be allocated a SchedulingRequestID of an SR configuration available in a logical channel configuration. In the embodiment of FIG. 6, it is assumed that a SchedulingRequestID 611 of SR configuration 1 is configured to be 0 and a SchedulingRequestID 621 of SR configuration 2 is configured to be 1. In addition, the SR configurations may include SRNotCancelByBSR fields 612 and 622 which correspond to configurations that prevent cancellation of an SR due to transmission of a specific BSR when the corresponding SR is triggered, respectively. In case that SRNotCancelByBSR is configured to be True, the SR may not be canceled in a case where the BSR is included in a specific MAC PDU described in the embodiment of FIG. 5. In the embodiment of FIG. 6, it is assumed that in the SR configuration 1, SRNotCancelbyBSR 612 is configured to be True and in the SR configuration 2, SRNotCancelbyBSR 622 is configured to be False. That is, an operation for preventing cancellation of an SR due to BSR transmission may be configured for each SR configuration.

Figure 7:
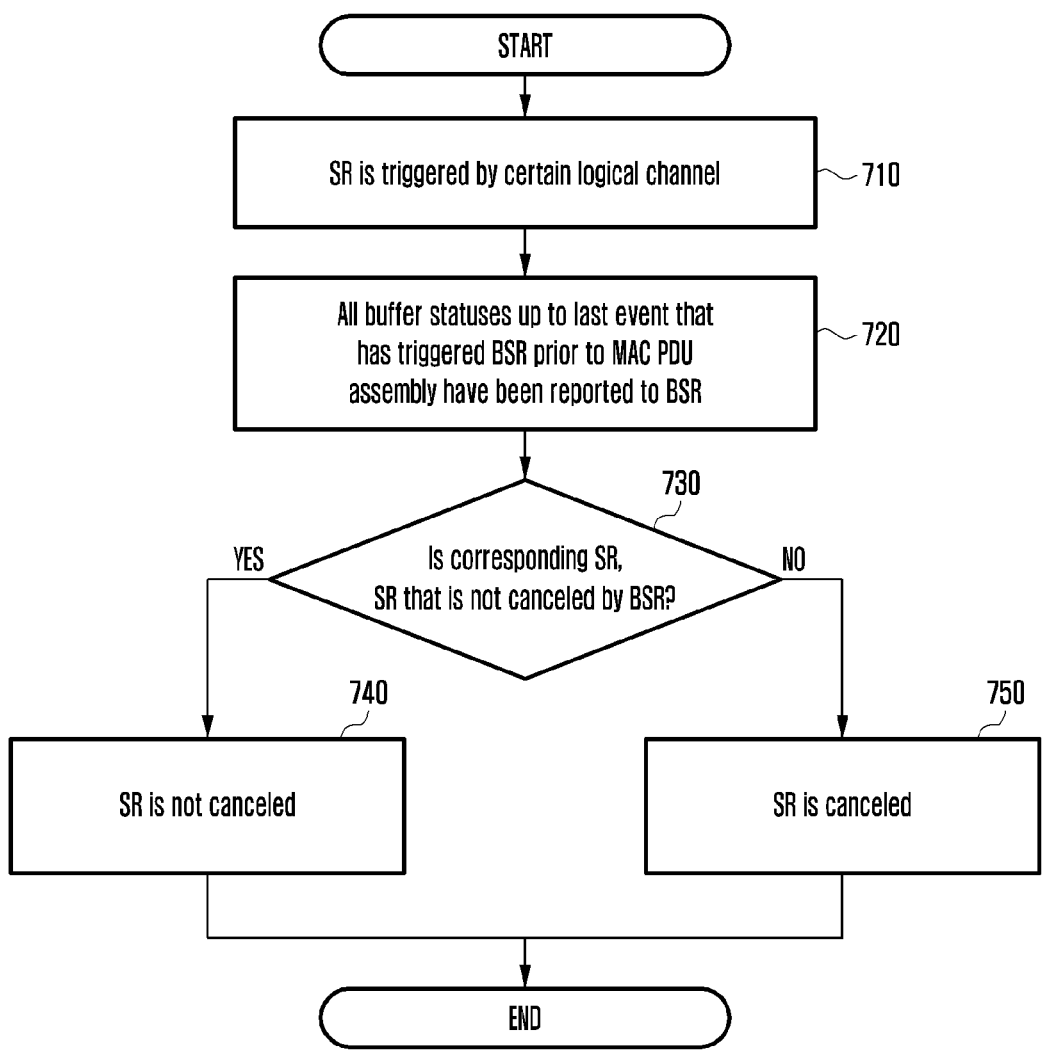
FIG. 7 illustrates a procedure of an SR cancellation operation according to a configuration according to an embodiment of the disclosure.

FIG. 7 illustrates a procedure of an SR cancellation operation according to a configuration according to an embodiment of the disclosure.

Referring to FIG. 7, in case that an SR has been triggered by a certain logical channel (710), a UE may wait for transmission of the SR, based on an SR configuration corresponding to the logical channel. Thereafter, a certain MAC PDU is allocated, and the UE generates a BSR including a buffer status up to the last event that has triggered the BSR prior to the MAC PDU assembly (720). The UE may transmit the MAC PDU including the BSR (720). In this case, the UE may or may not cancel the triggered SR according to the type of the SR configuration.

In case that the UE identifies whether the configuration of the corresponding SR corresponds to an SR that is not canceled by a specific BSR, an operation may be changed according to the result (730). The "SR that is not canceled by a specific BSR" may correspond to SRNotCancelbyBSR described in FIG. 6. In case that the corresponding SR is an SR that is not canceled by a BSR, the UE may not cancel the corresponding SR even when the BSR has been reported (740). Otherwise, in case that the SR is a SR that can be canceled by the BSR, the UE may cancel the corresponding SR (750).

Figure 8:
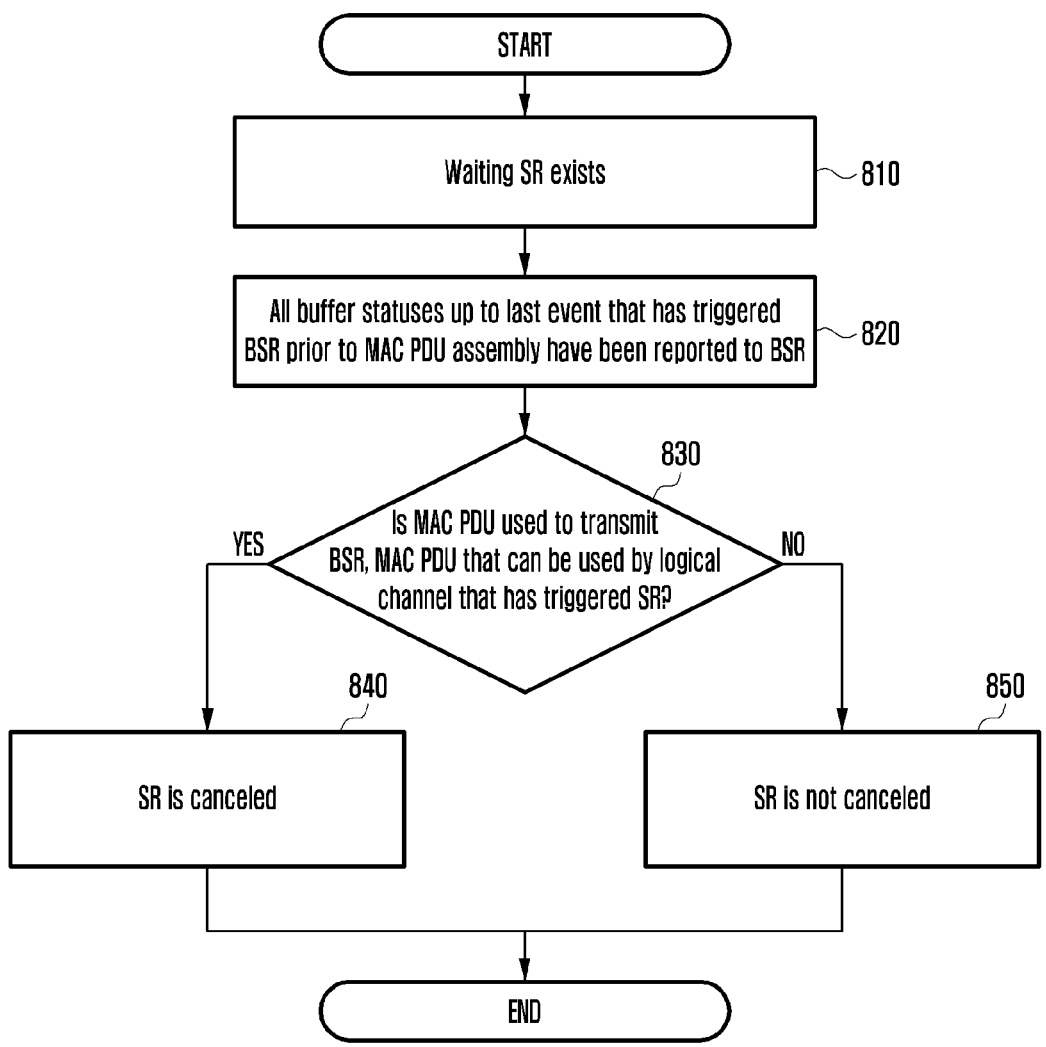
FIG. 8 illustrates a procedure of an SR cancellation operation according to an embodiment of the disclosure.

FIG. 8 illustrates a procedure of an SR cancellation operation according to an embodiment of the disclosure.

Referring to FIG. 8, in case that an SR has been triggered by a certain logical channel, a UE may wait for transmission of the SR, based on an SR configuration corresponding to the logical channel (810). Thereafter, a certain MAC PDU is allocated, and the UE generates a BSR including a buffer status up to the last event that has triggered the BSR prior to the MAC PDU assembly (820). The UE may transmit the MAC PDU including the BSR (820). In this case, the UE may or may not cancel the triggered SR according to the type of the MAC PDU including the BSR.

In the embodiment of FIG. 8, the UE may identify whether the MAC PDU used to transmit the BSR corresponds to a MAC PDU that can be used by the logical channel that has triggered the corresponding SR (830). For example, the UE may identify whether the logical channel that has triggered the SR corresponds to a logical channel that can use a resource of the corresponding MAC PDU, based on limitation of a resource that can be used by a logical channel, such as a cell that can be used by each logical channel, subcarrier spacing (SCS), and PUSCH duration. In case that the MAC PDU used to transmit the BSR corresponds to the MAC PDU that can be used by the logical channel that has triggered the SR, the UE may cancel the SR triggered by the logical channel that can use the MAC PDU resource (840). Otherwise, in case that the MAC PDU used to transmit the BSR does not correspond to the MAC PDU that can be used by the logical channel that has triggered the SR, the UE does not cancel the SR triggered by the logical channel that cannot use the MAC PDU resource (850). The operations described in FIG. 8 may be applied only to an SR triggered by a specific logical channel, and such information may be configured at the time of logical channel configuration. In another embodiment, the operations described in FIG. 8 may be applied only to a specific SR configuration, and such information may be configured at the time of SR configuration.

Figure 9:
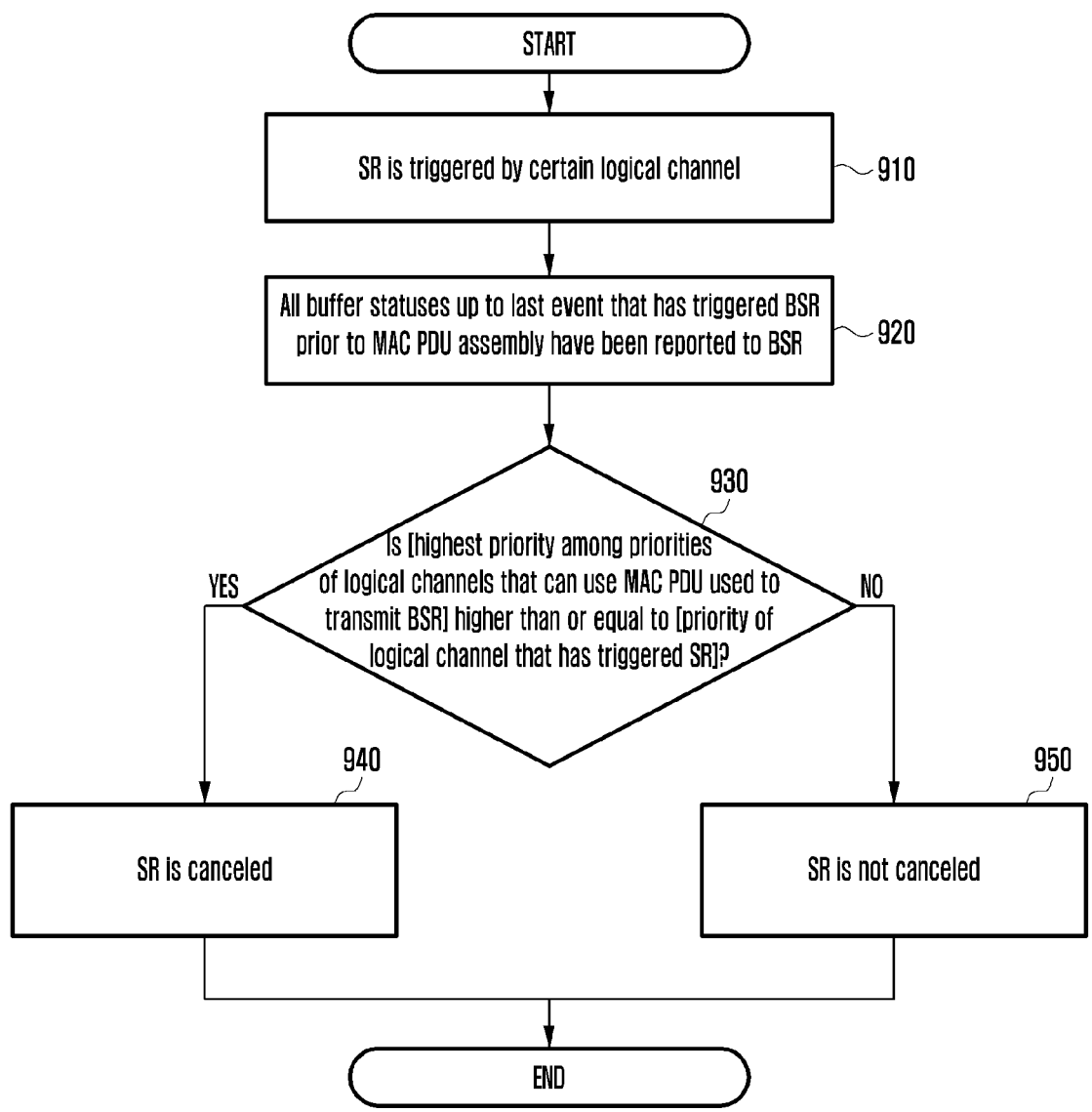
FIG. 9 illustrates a procedure of an SR cancellation operation according to an embodiment of the disclosure.

FIG. 9 illustrates a procedure of an SR cancellation operation according to an embodiment of the disclosure.

Referring to FIG. 9, in case that an SR has been triggered by a certain logical channel (910), a UE may wait for transmission of the SR, based on an SR configuration corresponding to the logical channel. Thereafter, a certain MAC PDU is allocated, and the UE generates a BSR including a buffer status up to the last event that has triggered the BSR prior to the MAC PDU assembly (920). The UE may transmit the MAC PDU including the BSR (920). In this case, the UE may or may not cancel the triggered SR according to the type of the MAC PDU including the BSR.

In the embodiment of FIG. 9, the UE may identify whether the highest priority among the priorities of logical channels that can use the MAC PDU used to transmit the BSR is higher than or equal to the priority of the logical channel that has triggered the SR (930). The UE may identify whether each logical channel corresponds to a logical channel that can use a resource of the corresponding MAC PDU, based on limitation of a resource that can be used by a logical channel, such as a cell that can be used by each logical channel, subcarrier spacing (SCS), and PUSCH duration. In case that the highest priority among the priorities of the logical channels that can use the MAC PDU used to transmit the BSR is higher than or equal to the priority of the logical channel that has triggered the SR, the UE may cancel the SR triggered by a logical channel having a lower priority than the highest priority among the priorities of the logical channels that can use the MAC PDU (940). Otherwise, in case that the highest priority among the priorities of the logical channels that can use the MAC PDU used to transmit the BSR is lower than the priority of the logical channel that has triggered the SR, the UE does not cancel the SR triggered by a logical channel having a higher priority than the highest priority among the priorities of the logical channels that can use the MAC PDU (950). The operations described in FIG. 9 may be applied only to an SR triggered by a specific logical channel, and such information may be configured at the time of logical channel configuration. The operations of FIG. 9 may also be applied in other embodiments, the operations described in FIG. 9 may be applied only to a specific SR configuration, and such information may be configured at the time of SR configuration.

Figure 10:
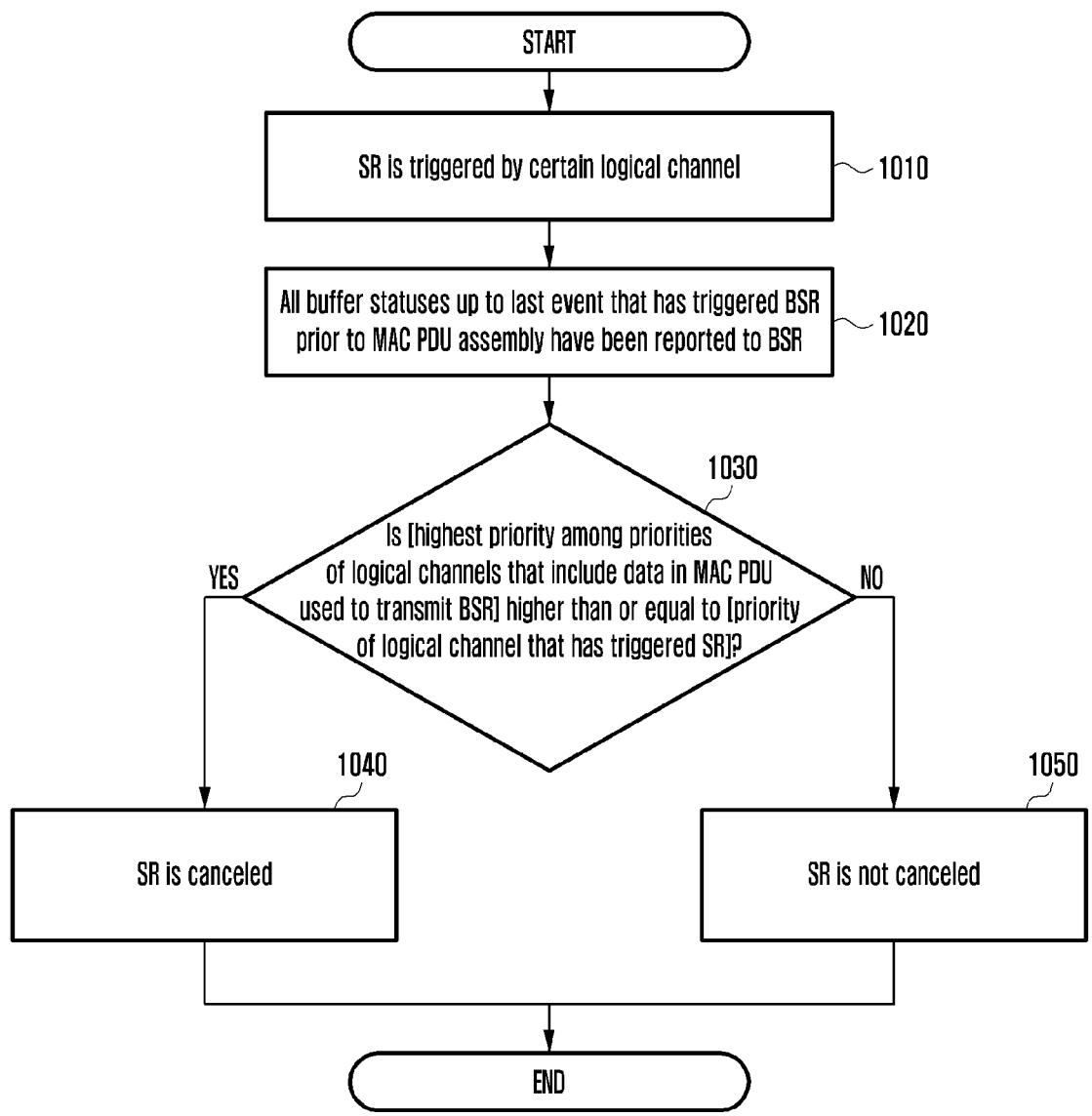
FIG. 10 illustrates a procedure of an SR cancellation operation according to an embodiment of the disclosure.

FIG. 10 illustrates a procedure of an SR cancellation operation according to an embodiment of the disclosure.

Referring to FIG. 10, in case that an SR has been triggered by a certain logical channel (1010), a UE may wait for transmission of the SR, based on an SR configuration corresponding to the logical channel. Thereafter, a certain MAC PDU is allocated, and the UE generates a BSR including a buffer status up to the last event that has triggered the BSR prior to the MAC PDU assembly (1020). The UE may transmit the MAC PDU including the BSR (1020). In this case, the UE may or may not cancel the triggered SR according to the type of the MAC PDU including the BSR.

In the embodiment of FIG. 10, the UE may identify whether the highest priority among the priorities of logical channels that include data in the MAC PDU used to transmit the BSR is higher than or equal to the priority of the logical channel that has triggered the SR (1030). The UE may identify whether each logical channel corresponds to a logical channel that can use a resource of the corresponding MAC PDU, based on limitation of a resource that can be used by a logical channel, such as a cell that can be used by each logical channel, subcarrier spacing (SCS), and PUSCH duration. In case that the highest priority among the priorities of the logical channels that include data in the MAC PDU used to transmit the BSR is higher than or equal to the priority of the logical channel that has triggered the SR, the UE may cancel the SR triggered by a logical channel having a lower priority than the highest priority among the priorities of the logical channels that include data in the MAC PDU (1040). Otherwise, in case that the highest priority among the priorities of the logical channels that include data in the MAC PDU used to transmit the BSR is lower than the priority of the logical channel that has triggered the SR, the UE does not cancel the SR triggered by the logical channel having a lower priority than the highest priority among the priorities of the logical channels that include data in the MAC PDU (1050). The operations described in FIG. 10 may be applied only to an SR triggered by a specific logical channel, and such information may be configured at the time of logical channel configuration. The operations of FIG. 10 may also be applied in other embodiments, the operations described in FIG. 10 may be applied only to a specific SR configuration, and such information may be configured at the time of SR configuration.

Figure 11:
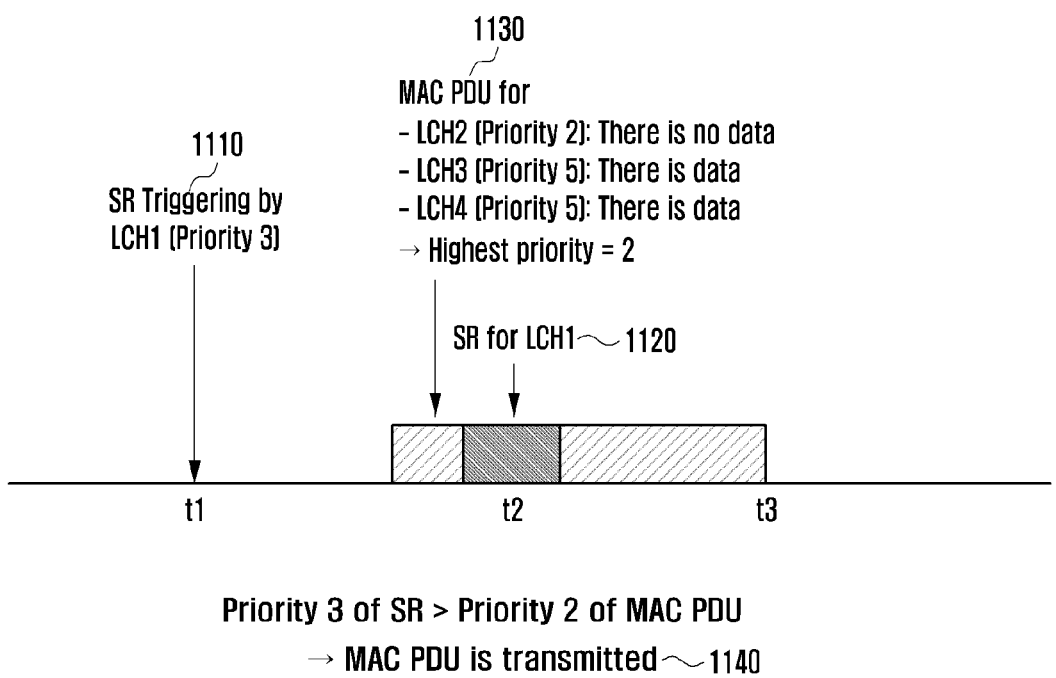
FIG. 11 illustrates a selective transmission scheme when radio resources of an SR and a MAC PDU conflict, according to an embodiment of the disclosure.

FIG. 11 illustrates a selective transmission scheme when radio resources of an SR and a MAC PDU conflict, according to an embodiment of the disclosure.

Referring to FIG. 11, when an SR has been triggered by a certain logical channel (1110, t1), a resource on which the corresponding SR can be transmitted (1120, t2) may overlap with a MAC PDU 1130 capable of transmitting data on the time axis resource or on the time axis and frequency axis resources. The MAC PDU corresponds to a PUSCH resource as a physical channel and corresponds to an uplink shared channel (UL-SCH) as a transmission channel. In this case, the UE is required to determine which of the SR resource and the MAC PDU capable of transmitting data is to transmit. In the embodiment of FIG. 11, the UE may determine whether to transmit the SR or whether to transmit the MAC PDU by using the priorities described in the embodiments of FIGS. 2 and 3.

For each MAC PDU, logical channels to use a MAC PDU resource may be determined by a logical channel configuration. Specifically, an available cell, subcarrier spacing (SCS), PUSCH duration, and the like may be configured for each logical channel. Based on the above configuration, it is possible to be aware of a logical channel by which a MAC PDU can be used. In addition, among logical channels that can use the MAC PDU, logical channels having data participate in a logical channel prioritization (LCP) process, and the UE may include data of each of the logical channels in the MAC PDU and transmit the same. In this case, the UE may compare the priority of the logical channel that has triggered the SR and the highest priority among the priorities of the logical channels that can use the MAC PDU, so as to select the transmission with the higher priority. In case that the priority of the logical channel that has triggered the SR is higher than the highest priority among the priorities of the logical channels that can use the MAC PDU, the UE may transmit the SR. In case that the priority of the logical channel that has triggered the SR is lower than the highest priority among the priorities of the logical channels that can use the MAC PDU, the UE may transmit the MAC PDU. In case that the priorities are the same, the UE may 1) prioritize the MAC PDU, 2) prioritize the SR, or 3) perform random selection.

In the embodiment of FIG. 11, the priority of the logical channel that has triggered the SR is 3, and the priority of a logical channel having the highest priority among the logical channels that can use the MAC PDU is 2. In the embodiment of FIG. 11, the UE performs a comparison by using the highest priority regardless of whether there is data to be transmitted by a logical channel or whether data is included in the MAC PDU. Accordingly, since the MAC PDU has a high priority of 2, the MAC PDU may be transmitted (1140).

Figure 12:
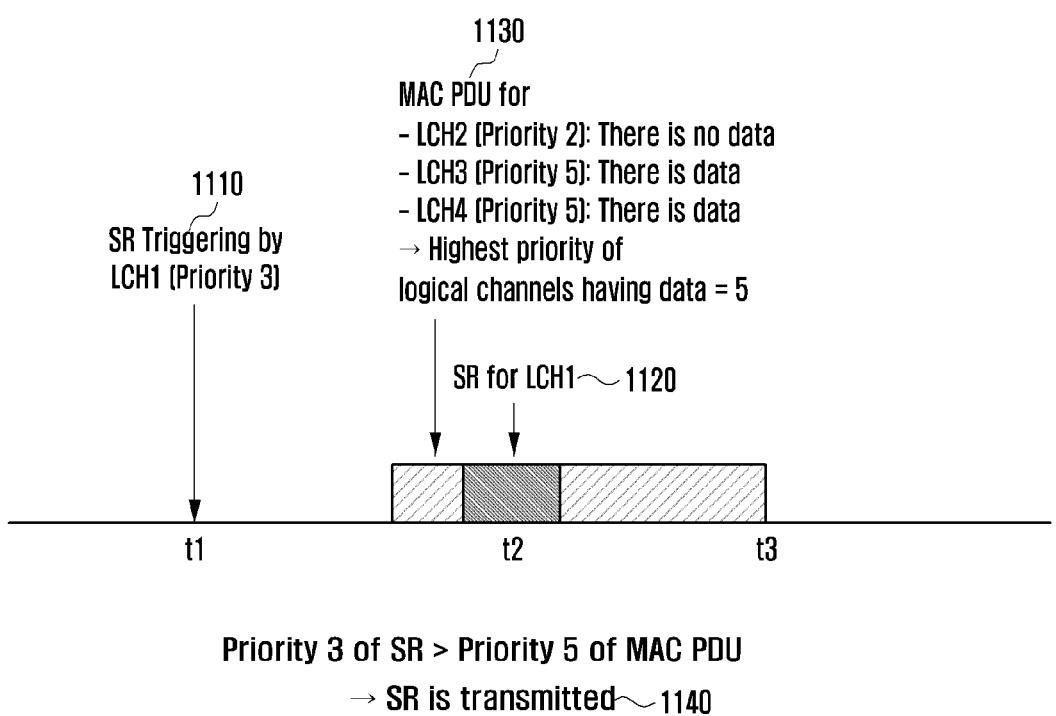
FIG. 12 illustrates a selective transmission scheme when radio resources of an SR and a MAC PDU conflict, according to an embodiment of the disclosure.

FIG. 12 illustrates a selective transmission scheme when radio resources of an SR and a MAC PDU conflict, according to an embodiment of the disclosure.

Referring to FIG. 12, when an SR has been triggered by a certain logical channel (1210, t1), a resource on which the corresponding SR can be transmitted (1220, t2) may overlap with a MAC PDU 1230 capable of transmitting data on the time axis resource or on the time axis and frequency axis resources. The MAC PDU corresponds to a PUSCH resource as a physical channel and corresponds to an uplink shared channel (UL-SCH) as a transmission channel. In this case, the UE is required to determine which of the SR resource and the MAC PDU capable of transmitting data is to transmit. In the embodiment of FIG. 12, the UE may determine whether to transmit the SR or whether to transmit the MAC PDU by using the priorities described in the embodiments of FIGS. 2 and 3.

For each MAC PDU, logical channels to use a MAC PDU resource may be determined by a logical channel configuration. Specifically, an available cell, subcarrier spacing (SCS), PUSCH duration, and the like may be configured for each logical channel. Based on the above configuration, it is possible to be aware of a logical channel by which a MAC PDU can be used. In addition, among logical channels that can use the MAC PDU, logical channels having data participate in a logical channel prioritization (LCP) process, and the UE may include data of each of the logical channels in the MAC PDU and transmit the same. In this case, the UE may compare the priority of the logical channel that has triggered the SR and the highest priority among the priorities of logical channels having data to transmit among the logical channels that can use the MAC PDU, so as to select the transmission with the higher priority. In case that the priority of the logical channel that has triggered the SR is higher than the highest priority among the priorities of the logical channels having data to transmit among the logical channels that can use the MAC PDU, the UE may transmit the SR. In case that the priority of the logical channel that has triggered the SR is lower than the highest priority among the priorities of the logical channels having data to transmit among the logical channels that can use the MAC PDU, the UE may transmit the MAC PDU. In case that the priorities are the same, the UE may 1) prioritize the MAC PDU, 2) prioritize the SR, or 3) perform random selection.

In the embodiment of FIG. 12, the priority of the logical channel that has triggered the SR is 3, and the priority of a logical channel having the highest priority and having data to transmit among the logical channels that can use the MAC PDU is 5. Therefore, since the priority, of 3, of the logical channel that has triggered the SR is higher than the priority, of 5, of the MAC PDU, the SR may be transmitted (1240). In the embodiment of FIG. 12, the priorities of the logical channels having data to transmit among logical channels having data to transmit to the MAC PDU are considered. However, in another embodiment, the highest priority among the priorities of logical channels that has actually transmitted data to the MAC PDU may be compared with the priority of the logical channel that has triggered the SR.

Figure 13:
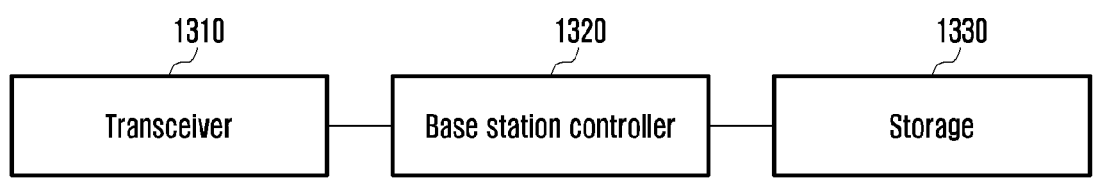
FIG. 13 illustrates a structure of a base station according to an embodiment of the disclosure.

FIG. 13 illustrates a structure of a base station according to an embodiment of the disclosure.

Referring to FIG. 13, a base station may include a transceiver 1310, a base station controller 1320, and a storage 1330. In an embodiment of the disclosure, the base station controller 1320 may be defined as a controller, a circuit or an application-specific integrated circuit, or at least one processor.

The transceiver 1310 may transmit or receive a signal to or from other network entities. For example, the transceiver 1310 may transmit system information to a UE, and may transmit a synchronization signal or a reference signal.

The base station controller 1320 may control the overall operation of the base station according to the embodiments proposed in the disclosure. For example, the base station controller 1320 may control a signal flow between blocks so as to perform an operation according to the above-described flowchart.

The storage 1330 may store at least one of information transmitted or received via the transceiver 1310 and information generated via the base station controller 1320.

Figure 14:
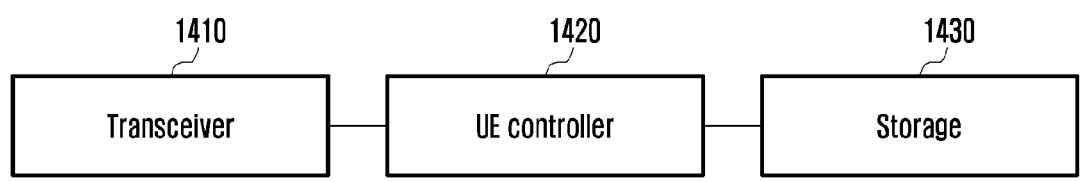
FIG. 14 illustrates a structure of a UE according to an embodiment of the disclosure.

FIG. 14 illustrates a structure of a UE according to an embodiment of the disclosure.

Referring to FIG. 14, a UE may include a transceiver 1410, a UE controller 1420, and a storage 1430. In the disclosure, the UE controller 1420 may be defined as a controller, a circuit or an application-specific integrated circuit, or at least one processor.

The transceiver 1410 may transmit or receive a signal to or from other network entities. For example, the transceiver 1410 may receive system information from a base station, and may receive a synchronization signal or a reference signal.

The UE controller 1420 may control the overall operation of the UE according to the embodiments proposed in the disclosure. For example, the UE controller 1420 may control a signal flow between blocks so as to perform an operation according to the above-described flowchart.

The storage 1430 may store at least one of information transmitted or received via the transceiver 1410 and information generated via the controller 1420.

Further, the embodiments described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. A method performed by a terminal in a communication system, the method comprising:
   triggering a buffer status report (BSR);
   triggering a scheduling request (SR) for the BSR;
   transmitting a medium access control (MAC) protocol data unit (PDU) including the BSR, before transmission of the SR; and
   determining whether to cancel the triggered SR, based on information on a priority of a logical channel corresponding to the SR and information on priorities of logical channels associated with the MAC PDU including the BSR,
   wherein the triggered SR is canceled based on a determination that a highest priority among the priorities of the logical channels associated with the MAC PDU including the BSR is higher than or equal to the priority of the logical channel that has triggered the SR.

2. The method of claim 1, wherein the logical channels associated with the MAC PDU correspond to logical channels that are allowed to use the MAC PDU.

3. The method of claim 1, wherein, in case that the MAC PDU is allowed to be used by the logical channel that has triggered the SR, the triggered SR is canceled.

4. The method of claim 1, wherein SR configuration information corresponding to the SR comprises identification information indicating whether the SR is to be canceled in relation to transmission of the BSR, and
   wherein whether to cancel the triggered SR is determined based on the identification information.

5. A terminal in a wireless communication system, the terminal comprising:
   a transceiver; and
   a controller configured to:
      trigger a buffer status report (BSR), trigger a scheduling request (SR) for the BSR,
      transmit a medium access control (MAC) protocol data unit (PDU) including the BSR, via the transceiver, before transmission of the SR, and
      determine whether to cancel the triggered SR, based on information on a priority of a logical channel corresponding to the SR and information on priorities of logical channels associated with the MAC PDU including the BSR,
   wherein the triggered SR is canceled based on a determination that a highest priority among the priorities of the logical channels associated with the MAC PDU including the BSR is higher than or equal to the priority of the logical channel that has triggered the SR.

6. The terminal of claim 5, wherein the logical channels associated with the MAC PDU correspond to logical channels that are allowed to use the MAC PDU.

7. The terminal of claim 5, wherein in case that the MAC PDU is allowed to be used by the logical channel that has triggered the SR, the triggered SR is canceled.

8. The terminal of claim 5, wherein SR configuration information corresponding to the SR comprises identification information indicating whether the SR is to be canceled in relation to transmission of the BSR, and
   wherein whether to cancel the triggered SR is determined based on the identification information.

9. A method performed by a base station in a wireless communication system, the method comprising:
   transmitting scheduling request (SR) configuration information to a terminal;
   receiving a medium access control (MAC) protocol data unit (PDU) including a buffer status report (BSR) from the terminal; and
   in case that an SR for the BSR is not canceled in the terminal, receiving the SR,
   wherein cancellation of the SR triggered by the terminal is determined based on information on a priority of a logical channel corresponding to the SR and information on priorities of logical channels associated with the MAC PDU including the BSR, and
   wherein the triggered SR is canceled based on a determination that a highest priority among the priorities of the logical channels associated with the MAC PDU including the BSR is higher than or equal to the priority of the logical channel that has triggered the SR.

10. The method of claim 9, wherein the logical channels associated with the MAC PDU correspond to logical channels that are allowed to use the MAC PDU.

11. The method of claim 9, wherein in case that the MAC PDU is allowed to be used by the logical channel that has triggered the SR, the SR triggered by the terminal is canceled.

12. The method of claim 9, wherein the SR configuration information comprises identification information indicating whether the SR is to be canceled in relation to transmission of the BSR, and
   wherein whether to cancel the triggered SR is determined based on the identification information.

13. A base station in a wireless communication system, the base station comprising:
   a transceiver; and
   a controller configured to:
      transmit scheduling request (SR) configuration information to a terminal via the transceiver,
      receive a medium access control (MAC) protocol data unit (PDU) including a buffer status report (BSR) from the terminal via the transceiver, and in case that an SR for the BSR is not canceled in the terminal, receive the SR via the transceiver,
wherein cancellation of the SR triggered by the terminal is determined based on information on a priority of a logical channel corresponding to the SR and information on priorities of logical channels associated with the MAC PDU including the BSR, and
wherein the triggered SR is canceled based on a determination that a highest priority among the priorities of the logical channels associated with the MAC PDU including the BSR is higher than or equal to the priority of the logical channel that has triggered the SR.

14. The base station of claim 13, wherein the logical channels associated with the MAC PDU correspond to logical channels that are allowed to use the MAC PDU.

15. The base station of claim 13, wherein in case that the MAC PDU is allowed to be used by the logical channel that has triggered the SR, the SR triggered by the terminal is canceled,
wherein the SR configuration information comprises identification information indicating whether the SR is to be canceled in relation to transmission of the BSR, and
wherein whether to cancel the triggered SR is determined based on the identification information.

\* \* \* \* \*